(No Model.)

W. D. NELSON.
SLAT PROTECTOR FOR DRAPERS.

No. 434,565.  Patented Aug. 19, 1890.

Witnesses,
Geo. H. Strong
J. H. Krause

Inventor,
William D. Nelson
By Dewey & Co.
Attys

UNITED STATES PATENT OFFICE.

WILLIAM D. NELSON, OF TRAVER, CALIFORNIA.

SLAT-PROTECTOR FOR DRAPERS.

SPECIFICATION forming part of Letters Patent No. 434,565, dated August 19, 1890.

Application filed September 21, 1889. Serial No. 324,691. (No model.)

*To all whom it may concern:*

Be it known that I, WILLIAM D. NELSON, a citizen of the United States, residing at Traver, Tulare county, State of California, have invented an Improvement in Slat-Protectors and Rivet-Guards for Drapers; and I hereby declare the following to be a full, clear, and exact description of the same.

My invention relates to the general class of drapers or belts for agricultural implements of any nature; and my invention consists in the novel construction and combination of parts, hereinafter fully described, and specifically pointed out in the claims, and the object of which is to accomplish the double purpose of protecting the ends of the draper slats or sticks by preventing them from splitting, and of guarding the rivets which hold the sticks to the belt, and preventing them from wearing loose and dropping out.

Figure 1:
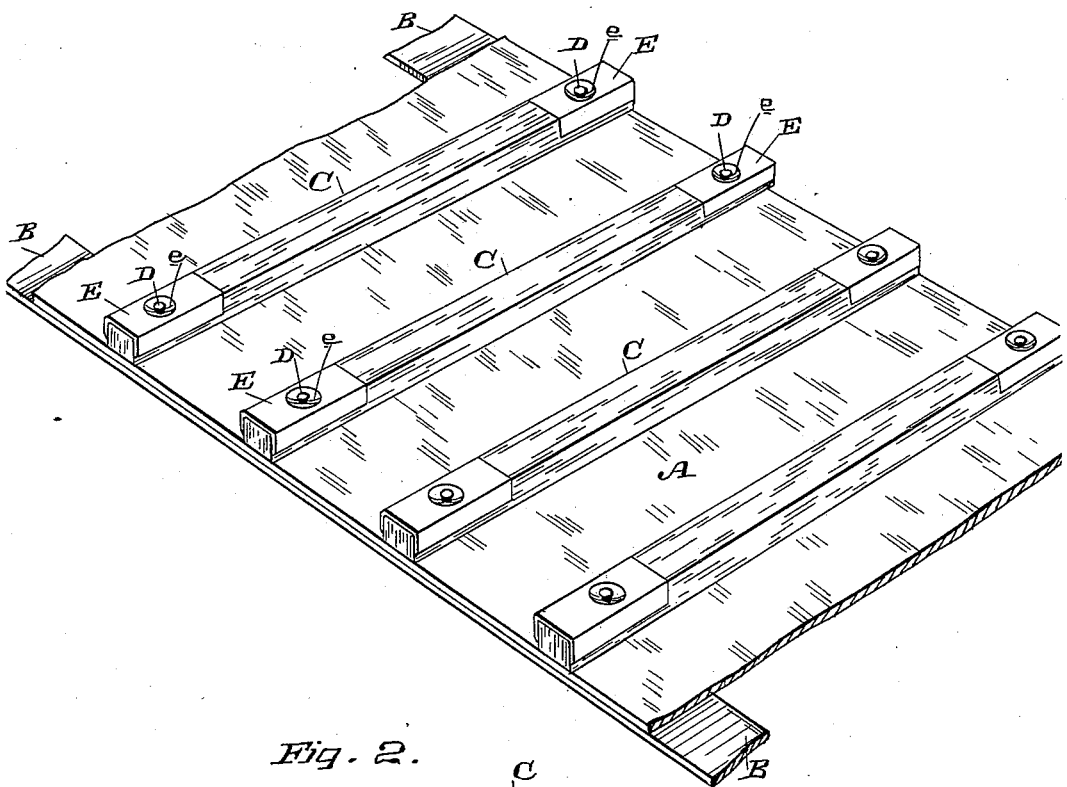
Figure 2:
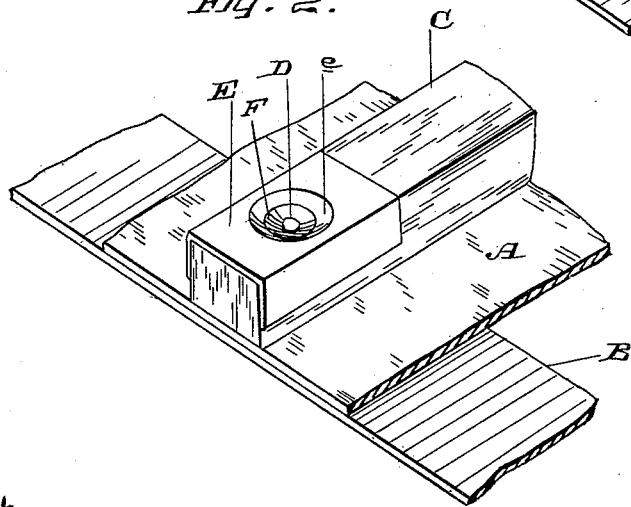

Referring to the accompanying drawings for a more complete explanation of my invention, Figure 1 is a perspective view of a draper or belt, showing the application of my protector to the slats. Fig. 2 is a view showing the addition of a burr when required.

A represents the draper or belt to be used in connection with any agricultural implement or any implement requiring such a belt. B are the leather straps at each side of the belt, and C are the slats or sticks. These extend transversely of the belt, parallel with each other and at stated distances apart, and they are usually secured to the belt and straps by means of rivets D, which pass through all these parts and receive burrs in countersunk portions or sockets formed in the sticks or slats. In this common form of connection there are the disadvantages of the ends of the sticks or slats splitting and of so wearing away as to loosen the burrs, allowing the rivets to drop out. I overcome these difficulties by my invention, which consists, essentially, of a sleeve or ferrule E, made of any suitable metal—as, for example, steel, iron, or any cast or malleable metal. This sleeve or ferrule is preferably formed with three sides, and is fitted over the slats or sticks at each end thereof, and the rivet passes through it and terminates in a socket or depression e, made in the ferrule, so as to provide for a smooth surface by countersinking. It will be found that ordinarily no burr will be required, as the sleeve or ferrule will serve as such, the rivet end being headed down directly over it; but in case a burr be needed it can be used as is shown by F in Fig. 2, the burr occupying the depression or socket in the sleeve or plate. This sleeve or ferrule, it will be seen, forms a complete protector for the ends of the sticks or slats, preventing them from splitting, and it also, by serving as a plate over which the rivet end is headed, forms a complete guard for the rivet, preventing its headed end from wearing off, and also, by preventing the stick itself from wearing off, further guards the rivet.

Having thus described my invention, what I claim as new, and desire to secure by Letters Patent, is—

1. In combination with a draper or belt and its sticks or slats, the three-sided metal protecting-plates fitted to the ends of the sticks or slats over their tops and bent downwardly on each side, and the rivets passing through the draper or belt, the sticks or slats, and the metal protecting-plates, substantially as described.

2. In combination with a draper or belt and its sticks or slats, the three-sided metal protecting-plates fitted to the end of each stick or slat, covering its top and bent down on each side, said plates having depressions in their tops, and the rivets passing through the draper or belt, the sticks or slats, and the metal protecting-plates, and headed in the depressed portions of said plates, substantially as described.

In witness whereof I have hereunto set my hand.

WILLIAM D. NELSON.

Witnesses:
W. D. TRUXBURY,
J. W. FRASER.